(12) United States Patent
Zeng et al.

(10) Patent No.: US 7,162,624 B2
(45) Date of Patent: Jan. 9, 2007

(54) SYSTEM AND METHOD FOR INITIALIZING HARDWARE COUPLED TO A COMPUTER SYSTEM BASED ON A BOARD SUPPORT PACKAGE (BSP)

(75) Inventors: Xin Zeng, Shenzhen (CN); Tang He, Shenzhen (CN)

(73) Assignees: Hong Fu Jin Precision Ind. (Shenzhen) Co., Ltd., Shenzhen (CN); Hon Hai Precision Ind. Co., Ltd., Tu-Cheng (TW)

( * ) Notice: Subject to any disclaimer, the term of this patent is extended or adjusted under 35 U.S.C. 154(b) by 446 days.

(21) Appl. No.: 10/837,423

(22) Filed: Apr. 30, 2004

(65) Prior Publication Data
US 2005/0044347 A1 Feb. 24, 2005

(30) Foreign Application Priority Data
Aug. 22, 2003 (TW) ............................. 92123141 A

(51) Int. Cl.
*G06F 15/177* (2006.01)
*G06F 9/224* (2006.01)
(52) U.S. Cl. .............................. 713/1; 713/2; 713/100; 716/107; 716/126; 716/127; 716/168; 714/2; 714/7; 714/13; 714/36

(58) Field of Classification Search ................. 713/1, 713/2, 100; 716/107, 126, 127, 168; 714/2, 714/7, 13, 36
See application file for complete search history.

(56) References Cited

U.S. PATENT DOCUMENTS

| 6,038,624 | A | 3/2000 | Chan et al. |
| 6,754,882 | B1 * | 6/2004 | Sanchez et al. ............... 716/16 |
| 2002/0184352 | A1 * | 12/2002 | Jain et al. .................... 709/223 |
| 2004/0158621 | A1 * | 8/2004 | Reyna ......................... 709/220 |

* cited by examiner

*Primary Examiner*—A. Elamin
*Assistant Examiner*—Nitin C. Patel
(74) *Attorney, Agent, or Firm*—Wei Te Chung

(57) ABSTRACT

A system for initializing hardware of a computer system includes a board support package (BSP) (20) and a ROM monitor (30). The BSP includes: a basic initialization module (21) for initializing a CPU, a Flash, etc.; an advanced initialization module (22) for initializing serial ports, an Ethernet, etc., for configuring parameters related to system operation and an interrupt service program; a function library (23) for storing various functions for performing configuration and modification of parameters of the hardware; and a boot loader (24) for determining whether parameters of the hardware need to be configured, and for booting an operating system or the ROM monitor based on the determination. The ROM monitor includes a command line editor (31) for inputting commands by users, a command translator (32) for translating the commands into computer-readable instructions, and a function invoking module (33) for invoking functions from the function library based on the instructions.

9 Claims, 2 Drawing Sheets

SYSTEM AND METHOD FOR INITIALIZING HARDWARE COUPLED TO A COMPUTER SYSTEM BASED ON A BOARD SUPPORT PACKAGE (BSP)

BACKGROUND OF THE INVENTION

1. Field of the Invention

The present invention relates to a system and method for initializing hardware of a computer system, and especially relates to a system and method for initializing hardware of a computer system by use of a board support package (BSP).

2. Background of the Invention

A board support package (BSP) is the common name for all board hardware-specific codes, and typically consists of a boot loader, an OEM adaptation layer (OAL) and board-specific device drivers. The BSP is responsible for the initialization of most or all of the hardware on a main board, while a ROM (read-only memory) monitor is responsible for processing various commands entered by users from a console. The ROM monitor generally provides a simple command prompt, with options for reading/writing memory and perhaps some power-on testing facilities that are useful before a kernel boots. The commands entered by users are used for program debugging, system diagnostics, configuration and program execution, etc.

The BSP should initialize most of the hardware on the main board while a computer system boots up. The ROM monitor should provide as much software support as possible, for the efficient research and development of computer systems and for efficiently testing manufactured computer systems. With the support of the ROM monitor, users can complete tasks that otherwise require testing equipment to complete. Nowadays, there are many embedded central processing units (CPUs) with various structures, such as pocket PC CPUs. For the sake of optimum performance, the CPUs with various structures should be matched with different BSPs. Based on this need, China Patent Application No. 01132224.1 provides a BSP simulation method. The method can simulate parts of functions of the BSP, for debugging communication programs under a personal computer environment.

The above-mentioned method can only partly perform functions of the BSP. The BSP cannot be wholly used to ensure smooth operation of hardware coupled to the main board. Therefore, a system and method is needed for initiating the hardware based on the BSP.

SUMMARY OF THE INVENTION

Accordingly, an objective of the present invention is to provide a system for initializing hardware of a computer system based on a board support package.

Another objective of the present invention is to provide a method for initializing hardware of a computer system based on a board support package.

In order to accomplish the above-mentioned first objective, a preferred system for initializing hardware of a computer system comprises a board support package (BSP) and a ROM monitor. The BSP comprises a basic initialization module for initializing the most basic system such as a CPU, a Flash, a SDRAM (Synchronous Dynamic Random Access Memory) and so on, and for making sure that an initialization program can proceed, and for preparing for an advanced initialization; an advanced initialization module for performing more complicated initialization tasks such as initialization for serial ports, an Ethernet and so on, configuration of certain parameters related to system operation, and configuration of interrupt service program; a function library for storing various functions that can perform configuration and modification of parameters of the hardware; and a boot loader for determining whether parameters of the hardware need to be configured or modified, and for booting an operating system or the ROM monitor based on the determination result. The most important task of the advanced initialization module is to set up various data structures to prepare for running of an operating system or the ROM monitor. The ROM monitor comprises a command line editor for inputting commands by users, a command translator for translating the input commands into instructions readable by the computer system, and a function invoking module for invoking corresponding functions from the function library of the BSP based on the instructions to accomplish needed functions.

In order to accomplish the above-mentioned second objective, a preferred method for initializing hardware of a computer system based on a board support package comprises the steps of: (i) initializing basic systems including a CPU, a Flash and a synchronous dynamic random access memory; (ii) performing operations including initialization for serial ports and an Ethernet, and configuration of certain parameters related to system operation and configuration of interrupt service program; (iii) determining whether parameters of the hardware need to be configured or modified; (iv) obtaining a configuration command if the hardware needs to be configured or modified; (v) converting the configuration command into a system-readable instruction; and (vi) invoking a corresponding function to performing operations on configuration of the hardware based on the system-readable instruction. Step (iii) further comprises the step of booting an operating system of the computer system if the hardware does not need to be configured or modified.

Other objects, advantages and novel features of the present invention will be drawn from the following detailed description of preferred embodiments of the present invention with the attached drawings, in which:

DETAILED DESCRIPTION OF PREFERRED EMBODIMENTS OF THE INVENTION

Figure 1:
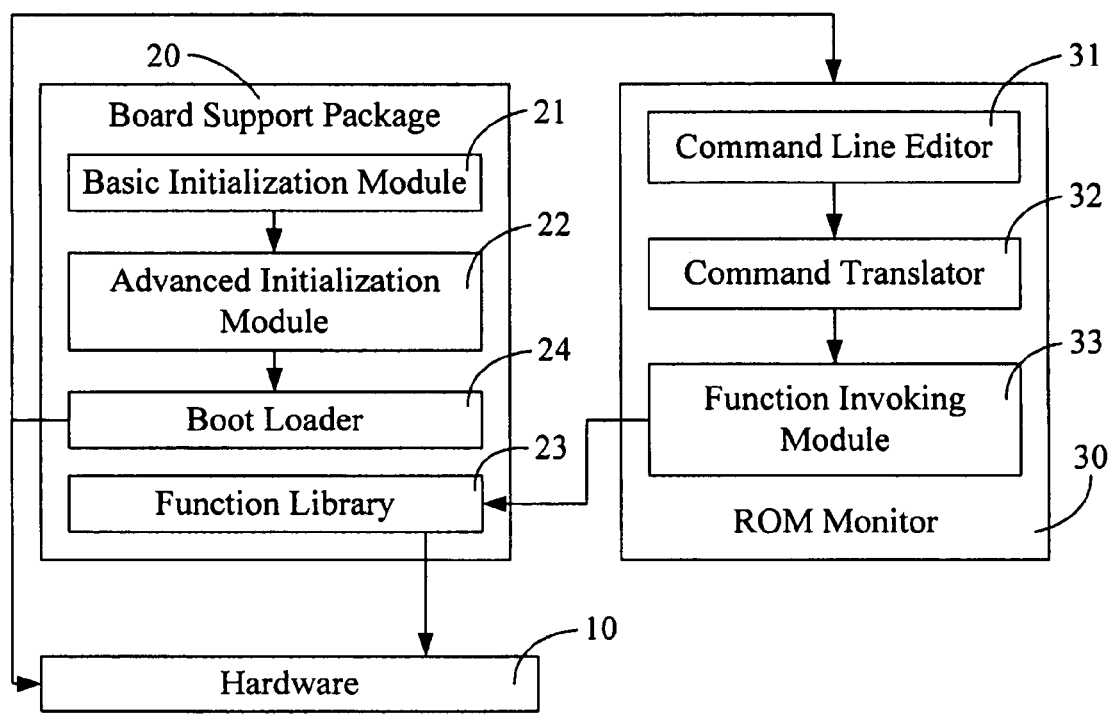
FIG. 1 is a schematic block diagram of an infrastructure of a board support package and a ROM monitor of a computer system in accordance with a preferred embodiment of the present invention, together with hardware.

FIG. 1 is a schematic block diagram of an infrastructure of a board support package (BSP) 20 and a ROM monitor 30 of a computer system in accordance with a preferred embodiment of the present invention, together with hardware 10. The BSP 20 is mainly responsible for initializing the hardware 10, and comprises a basic initialization module 21, an advanced initialization module 22, a function library 23 and a boot loader 24. The ROM monitor 30 has a command line editor 31, a command translator 32, and a function invoking module 33. Some functions of the ROM monitor 30 are accomplished through the BSP 20. Remaining functions of the ROM monitor 30 are accomplished by directly accessing the hardware 10 initialized by the BSP 20, or are accomplished by the BSP 20 and the hardware 10 cooperating together.

The basic initialization module 21 is provided for initializing the most basic system such as a CPU, a Flash, an SDRAM (Synchronous Dynamic Random Access Memory) and so on, for making sure that an initialization program can proceed, and for preparing for an advanced initialization.

The advanced initialization module 22 is configured for performing more complicated initialization tasks. These tasks include initialization for serial ports, an Ethernet and so on, configuration of certain parameters related to system operation, and configuration of an interrupt service program. The most important task of the advanced initialization module 22 is to set up various data structures to prepare for running of an operating system or the ROM monitor 30. The function library 23 stores various functions that can perform configuration and modification of parameters of the hardware 10. The boot loader 24 is configured for determining whether parameters of the hardware 10 need to be configured or modified, and for booting an operating system or the ROM monitor 30 based on the result of such determination.

The command line editor 31 is provided for inputting commands by users. In the preferred embodiment, the commands are very basic and simple. That is, command parameters are flexible enough so that the users can accomplish relatively complicated functions with basic commands. The command translator 32 is utilized for translating the input commands into instructions readable by the computer system. The function invoking module 33 is used for invoking corresponding functions from the function library 23 of the BSP 20, based on the instructions to accomplish needed functions.

Figure 2:
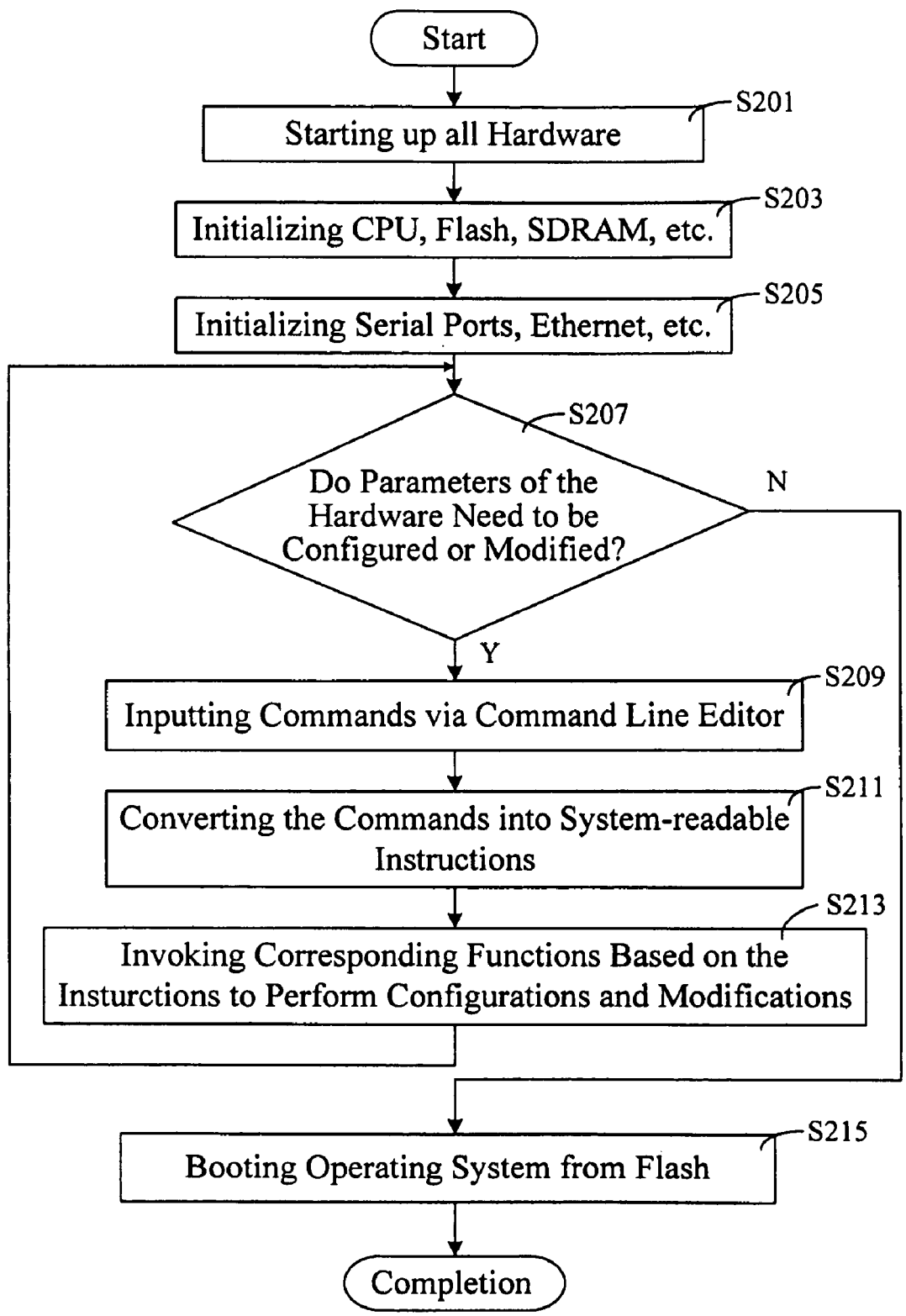
FIG. 2 is a schematic diagram of a method for initializing hardware with a board support package in accordance with the preferred embodiment of the present invention.

FIG. 2 is a schematic diagram of a preferred method for initializing hardware 10 with the BSP 20, in accordance with the present invention. At step S201, all hardware 10 of the computer system is started up. At step S203, the basic initialization module 21 initializes the most basic components, such as the CPU, the Flash, the SDRAM and so on. At step S205, the advanced initialization module 22 performs initialization for serial ports, an Ethernet and so on. At step S207, the boot loader 24 determines whether parameters of the hardware 10 need to be configured or modified. If the parameters of the hardware 10 do not need to be configured or modified, at step S215, the boot loader 24 selects booting operating system from the Flash, and the procedure is completed. If the parameters of the hardware 10 need to be configured or modified, at step S209, relevant commands are input to the ROM monitor 30 by a user via the command line editor 31. At step S211, the command translator 32 converts the commands into system-readable instructions. At step S213, based on the instructions, the function invoking module 33 invokes corresponding functions from the function library 23, to perform the needed configuration and modification of the hardware 10. After the configuration and modification are finished, the procedure returns to step S207, and the boot loader 24 again determines whether parameters of the hardware 10 need to be configured or modified once time. If the parameters of the hardware 10 still need to be configured or modified, the procedure repeats the relevant above-described steps until no parameter needs to be configured or modified.

Although only a preferred embodiment and preferred method of the present invention have been described in detail above, those skilled in the art will readily appreciate that many modifications to the preferred embodiment and method are possible without materially departing from the novel teachings and advantages of the present invention. Accordingly, all such modifications are deemed to be covered by the following claims and allowable equivalents of the claims.

What is claimed is:

1. A system for initializing hardware of a computer system based on a board support package, the system comprising the board support package and a ROM monitor, wherein:

the board support package comprises:
    an initialization module for performing initialization; and
    a boot loader for determining whether parameters of the hardware need to be configured or modified; and the ROM monitor comprises:
    a command line editor providing an interface for obtaining commands input by users;
    a command translator for converting the commands into system-readable instructions; and
    a function invoking module for invoking corresponding functions and performing configuration and modification of the hardware.

2. The system as recited in claim 1, further comprising a function library for storing the functions for performing configuration and modification of the hardware.

3. The system as recited in claim 1, wherein the initialization module comprises a basic initialization module for initializing basic systems including a central processing unit (CPU), a Flash and a synchronous dynamic random access memory.

4. The system as recited in claim 1, wherein the initialization module comprises an advanced initialization module for performing operations, said operations including initialization for serial ports and an Ethernet, configuration of certain parameters related to system operation, and configuration of an interrupt service program.

5. The system as recited in claim 1, wherein the boot loader boots the ROM monitor if the parameters of the hardware need to be configured or modified.

6. The system as recited in claim 1, wherein the boot loader boots an operating system of the computer system if the parameters of the hardware do not need to be configured or modified.

7. A method for initializing hardware of a computer system based on a board support package, the method comprising the steps of:

initializing basic systems including a central processing unit (CPU), a Flash and a synchronous dynamic random access memory;

determining whether parameters of the hardware need to be configured or modified;

obtaining a configuration command if the hardware needs to be configured or modified;

converting the configuration command into a system-readable instruction; and invoking a corresponding function to performing one or more operations on configuration of the hardware based on the system-readable instruction.

8. The method as recited in claim 7, further comprising the step of:

performing operations including initialization for serial ports and an Ethernet, configuration of certain parameters related to system operation, and configuration of an interrupt service program.

9. The method as recited in claim 7, further comprising the step of:

booting an operating system of the computer system if the hardware does not need to be configured or modified.

* * * * *